Dec. 4, 1951     C. C. LAURITSEN     2,577,253
RADIATION METER
Filed May 15, 1950
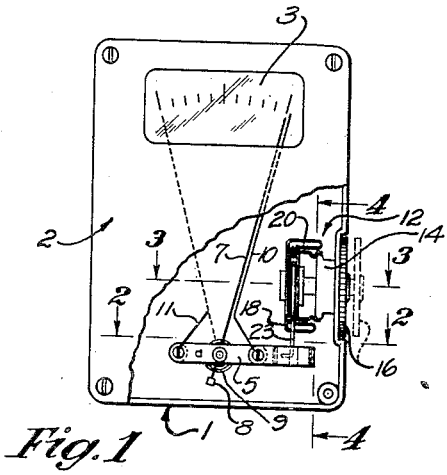
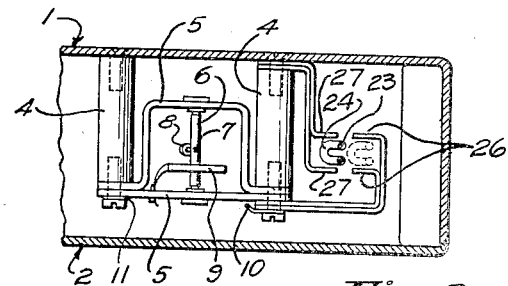
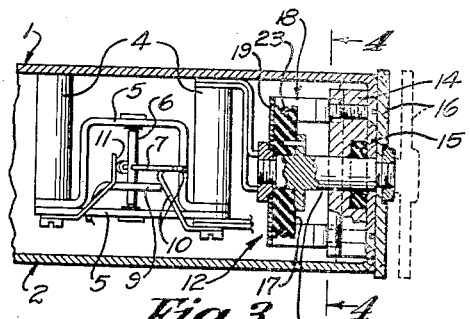
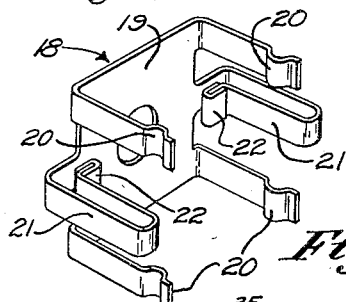
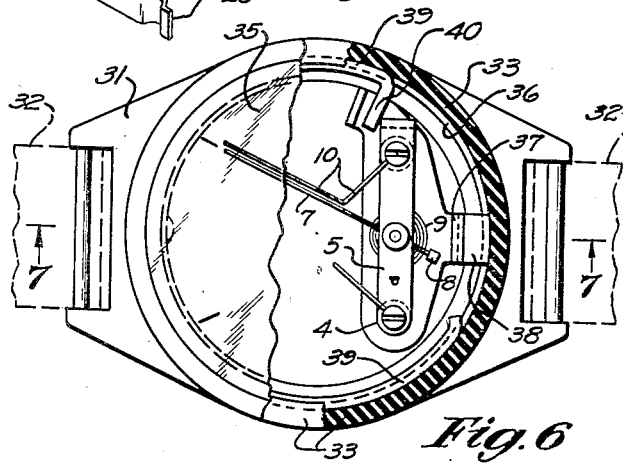
INVENTOR.
Charles C. Lauritsen
BY
Lyon & Lyon
Attorneys.

Patented Dec. 4, 1951

2,577,253

UNITED STATES PATENT OFFICE

2,577,253

RADIATION METER

Charles C. Lauritsen, Pasadena, Calif., assignor to California Institute Research Foundation, Pasadena, Calif., a corporation of California Application May 15, 1950, Serial No. 162,017

6 Claims. (Cl. 250—83.3)

My invention relates to radiation meters, more particularly to portable radiation meters adapted to be worn on the person to measure radiation intensity and avoid overexposure.

Heretofore such devices were needed only by persons who were well aware of the hazards to life of radiation from radioactive substance, and who were sufficiently skilled in the use of instruments too involved for dependable use by unskilled persons.

The large scale development of atomic energy sources and the present emphasis in several countries on the production of increasingly powerful atomic weapons has, however, considerably changed this picture. Tremendous and altogether unprecedented quantities of dangerously radioactive substances can now be liberated in a single explosion or manufactured in a nuclear energy plant and delivered in the form of radioactive poisons producing radiation hazards of a fantastic magnitude. Spectacular as are the immediate destructive effects of the explosion of a nuclear bomb, the after-effects of the radiation and the contamination by radioactive elements bid fair to be the more decisive in future warfare. In the Hiroshima explosion 15 to 20 per cent of the casualties resulted from radiation damage inflicted at the instant of detonation: it is estimated that all exposed persons within a radius of about half a mile received lethal or near-lethal doses of gamma-radiation. Because the bomb was initiated high in the air, the residual radioactive contamination was negligible. In test Baker, at Bikini, the explosion took place under water and the instantaneous radiation was largely absorbed. On the other hand, the resulting "base surge" of mist and spray caused a precipitation of radioactive materials estimated to be lethal over several square miles and the lagoon, together with its plant and animal life was dangerously contaminated for some months. When one considers that only a few pounds of radioactive materials are produced in such a bomb and that perhaps some tons would be produced by the neutrons resulting from an H-bomb explosion, it does not seem unreasonable to expect that such an explosion, under suitable meteorological conditions, could render a large city so "hot," in the sense of producing a high level of radiation, that it could not be inhabited for years or even generations. Nor need such a catastrophe be accompanied by an explosion: A single nuclear power reactor could be used to render a large city uninhabitable for an indefinite period. The active materials produced by such a reactor could be incorporated in a few hundred pounds of dust or sand and distributed from an airplane or from rockets launched from ships or submarines. About 60% of the reactor by-products have half lives between a few days and a year: the effective life would be about a month. In a month's time a new supply will be produced by the reactor and could then be used to maintain the contamination level if desired. Such a weapon has from many points of view, considerable military advantage, against an unprotected population, even over the much publicized H-bomb; the target city would be completely undamaged and, after cessation of the periodic contaminations, could be taken over by the invading forces. These facts, together with the consideration that only waste products are used and no expensive energy-source materials are lost would seem to suggest this as the most likely atomic weapon of a future attack on Western Europe and perhaps even on the United States.

An insidious feature of radioactive contamination whether present as the aftermath of a nuclear explosion or as a primary weapon is that the radiation is undetectable by the senses. A general body dose of the order of a few hundred Roentgens accumulated in a sufficiently short time may produce no immediately visible effect but may nevertheless result in the death of the victim in a few days or weeks. Even at a much slower rate of a few tens of Roentgens per day, grave damage may be done before identifiable physiological effects appear. In this respect, an overdose of radiation is analogous to sunburn, where the victim may receive a painful or dangerous burn without any effects being observable during the exposure period. In view of the impossibility of judging without instruments such extreme hazards to which large numbers of people will be exposed without warning, in case of an attack, it is clear that there exists a need of quite a new order of magnitude for radiation meters suitable for evaluating such hazards.

Radiation-measuring instruments needed for the routine protection of those actually engaged in atomic energy work are in general use. These instruments are, for the most part, designed to deal with levels of radiation intensity in the general neighborhood of or far below the presently accepted "tolerance" magnitude;[1] they are there-

---

[1] The "tolerance" level, of the order of 0.05 Roentgen unit per day is estimated to be the maximum rate at which the human body can absorb radiation continuously without demonstrable, cumulative effects.

fore of relatively high sensitivity and accuracy. They are needed in rather small numbers, so that the cost of such instruments is not a determining factor in design. They are used by people experienced in radiation measurement, and therefore need not be especially rugged or simple.

An entirely different problem is presented by the radiation instrumentation needed for citizens, rescue teams, and military personnel involved in an atomic disaster of the character discussed above. In such a case, one will have to deal with very high levels of radiation intensity, as compared with the "tolerance" level and quick action in leaving a heavily contaminated area will be necessary to avert radiation illness or death. It is essential, however, to be sure that one is moving away from contaminated areas to areas where the radiation level is lower; this can scarcely be done except on a basis of continuous measurements of the radiation intensity. Rescue activities must be conducted with some regard for the lives and safety of the rescue personnel; only a measurement of radiation intensity can determine how long it is safe to stay in a given contaminated area without receiving a lethal dose, or running an unreasonable risk. It will be imperative to determine, by some simple means, which living victims of an atomic disaster have received so large a dose of radiation that their death is inevitable, so that the limited rescue facilities can be concentrated on those victims who have some chance of survival. Recently the Atomic Energy Commission has announced the development of an identification tag which will indicate by change in color when a victim has received a lethal dose of radiation. This should fulfill a most important need if sufficiently generally adopted, but such devices do not obviate the urgent need for a continuously indicating meter for use by less seriously affected victims and rescue personnel. Finally, the movement of combat troops through a contaminated area requires a careful evaluation of radiation hazards, based upon radiation intensity measurements made at each point to be occupied.

Not the least important function of a radiation instrument under the circumstances envisaged is that of preventing mass hysteria and widespread panic. It does not require any imagination to see that the consequences of even a false alarm of a radioactive attack or of local contamination at some distance from a bomb blast could be disastrous in the absence of effective means for each individual to ascertain for himself the true state of affairs. The very fact of the undetectability of such materials by ordinary means and of the delayed reaction opens the possibility of using the threat of radioactive attack as a most terrifying psychological weapon.

The properties of the radiation-measuring instruments needed for the purposes just described are quite different from the properties of existing instruments. The radiation meters for disaster use are needed in large numbers; hence they must be simple and cheap to make. They will be used by people unfamiliar with such matters; therefore they must be extremely rugged, easy to use, and reliable both in indication and in the ease of interpreting that indication. In order to serve their purpose adequately they should be as simple and common as flashlights, gas masks or first aid kits, available to every rescue crew, civilian defense team or squad of troops. Since many of the instruments in a bombed area will be out of commission, either from physical damage or neutron-induced radioactivity of the instruments themselves, sufficient emergency stores must be maintained for instant availability from dispersed depots. In view of the uncertainty as to when and where such stores will be put into use, the maintenance required should be kept to a minimum: even batteries, which require replacement once or twice a year should be avoided if possible.

It has been indicated above that the sensitivity of a radiation meter for disaster use need not be high. Indeed, it might be considered that a device which would give a measurable indication when a few per cent of a lethal dose, say 50 Roentgens, had been received would cover most exigencies. On the other hand, it is clearly preferable to have a means of estimating in a few seconds or minutes how long a contaminated area can safely be occupied. Even a dose of 50 Roentgens may have deleterious effects and should be avoided if possible. With a more sensitive instrument, the degree of hazard can be estimated from the rate of discharge with negligible exposure to the user, and large areas can be rapidly surveyed in a short time. The planning of operations in a contaminated area for hours or days ahead can only be carried out if the radiation intensity is known long before dosages of dangerous magnitudes are accumulated. A sensitivity of the order of 0.1 to 1.0 Roentgen full scale, which is easily attainable in a simple instrument, would appear to be a reasonable value, provided the instrument can be recharged at will. With a sensitivity of 1 Roentgen, for example, a full scale deflection in one minute would indicate the relatively high hazard of 60 Roentgens per hour; an area where such a rate is observed should be immediately evacuated, and any entry into the area limited to as short a time as possible. On the other hand, if only 0.1 Roentgen is indicated in one minute, operations can be executed at a more leisurely pace. The important point is that the information necessary to evaluate the hazard is immediately at hand, and available to those most directly concerned.

Accordingly, then, an object of my invention is to provide a simple, inexpensive radiation meter which is feasible for mass production.

Another object is to provide a radiation meter which may be dependably used even by unskilled persons.

A further object is to provide a radiation meter which is self-contained; that is, requiring no extraneous charging device.

Yet another object is to provide a radiation meter which is inherently rugged, capable of standing considerable use as would be occasioned by being worn on the person under adverse conditions.

With the above and other objects in view as may appear hereinafter, reference is directed to the accompanying drawings in which:

Figure 1 is a plan view showing one form of my radiation meter with a portion of the cover broken away, to illustrate the mechanism.

Figure 2 is an enlarged fragmentary, transverse, sectional view thereof taken substantially through 2—2 of Figure 1.

Figure 3 is another transverse sectional view taken through 3—3 of Figure 1.

Figure 4 is a fragmentary, longitudinal view taken through 4—4 of Figure 1.

Figure 5 is perspective view of the retainer and brush holder unit.

Figure 6 is a partial plan, partial sectional view of a modified form of my radiation meter.

Figure 7 is a sectional view thereof through 7—7 of Figure 6.

Reference is first directed to the construction shown in Figures 1–5. In this construction a case 1 is provided which is preferably approximately the size of a cigarette package and of conducting or semi-conducting material or lined with such material.

The case is provided with a cover 2 in which is provided a transparent window 3. Near the end of the case at the opposite end from the window 3 is a pair of mounting posts 4 of insulating material which support a pivot frame 5. The pivot frame is provided with bearings which journal the pointed ends of a needle shaft 6. These bearings may be jeweled bearings, but in actual practice much cheaper bearings may be used advantageously.

The pivot shaft supports a movable electrode or needle 7 of small diameter which extends across the case and underlies the window 3. The needle is located approximately mid-way between the cover and back of the case and is provided with a counterweight 8 to permit reading in any position. Attached to the pivot shaft and to the pivot frame is a restoring spring 9, preferably a spiral spring.

The spring urges the needle 7 to the right or clockwise as viewed in Figure 1. Supported from one of the mounting posts 4 is a fixed electrode or arm 10 co-extensive with the needle 7 and against which the needle may bear in the extreme position urged by the spring 9. The other mounting post 4 supports a stop 11 formed of small diameter wire to limit pivotal movement of the needle away from the arm 10. The pivot frame, pivot, and restoring spring are all electrically connected and constitute a meter movement.

When the needle and fixed arm are uncharged, they occupy the position adjacent each other as shown in Figure 1. When, however, the meter movement is charged, the needle 7 is repelled against the action of the spring 9 and occupies its extended position indicated by broken lines or some intermediate position.

The meter movement is charged by a charging unit 12 which includes a shaft 13 journalled in a bearing block 14 fixed to the side of the case 1. The shaft 13 protrudes through the bearing and a sealing ring 15 therein, and its outer end is provided with a winding disc 16 knurled at its periphery and of a diameter approximating the depth of the case 1. The disc is preferably recessed or shielded so that it is not readily pulled out by accident.

The inner end of the shaft 13 carries a charging wheel 17 formed of appropriate dielectric material capable of collecting a surface charge of static electricity. Also carried by the extremity of the shaft is a brush holder and retainer clip 18 which includes a plate portion 19 secured to the extended end of the shaft 13. Extending from the corners of the plate 19 are clip fingers 20 which engage the sides of the bearing block 14 so as to retain the shaft in an axially inner position shown by solid lines in Figure 3 or in an axially outer position shown by broken lines.

The plate 19 also supports friction or brush arms 21 folded to form spring elements and terminating in fingers covered with friction material 22. The friction material is adapted to ride in a peripheral groove provided in the charging wheel 17. A static charge take off clip 23 is provided. The clip is formed of wire and doubled upon itself and its extremities shaped to form curved portions which ride in the groove provided in the charging wheel 17. The doubled mid-portion of the take-off clip 23 is bent laterally to form a contact tip 24. The contact tip is adapted when the disc 16 is drawn to its extended or dotted line position to engage either one of a pair of fingers 26 in a position to embrace the contact tip. These fingers are joined electrically to the meter movement. When the disc 16 is in its retracted position shown by solid lines, the contact tip 24 is retained between fingers 27 electrically grounded to the case 1.

Operation of the radiation meter shown in Figures 1 to 5 inclusive is as follows:

When desiring to charge the meter, the winding disc 16 is drawn outwardly to the dotted line position shown in Figure 3. This places the tip 24 between the fingers 26. A subsequent twist of the winding disc 16 causes a static charge to be generated on the surface of the charging wheel 17 by reason of its contact with the friction material 22. The static charge is drained from the charging wheel 17 by the take-off clip 23 and such charge is conducted through the tip 24 to the fingers 26 and thereby to the meter movement. On being charged, the fixed arm repels the needle 7. Upon completion of the charging operation the disc 16 is returned to its retracted position separating the tip 24 from the fingers 26 and grounding this tip through fingers 27. The force of the restoring spring is so pre-determined that a full scale movement of the needle 7 will indicate some pre-selected amount of exposure to radioactive radiations.

Reference is now directed to the constructions shown in Figures 6 and 7. This construction is so arranged as to be worn in a manner of a wrist watch. A base 31 is provided, the extremities of which are provided with means for attachment to a wrist strap 32. A case 33 fits over the base 31 and is retained by pins 34 which ride in a circumferential groove so that the case 33 is free to rotate on the base 31. The case 33 is provided with a suitable, transparent cover 35. Supported from the base are mounting posts 4 and the other elements of the meter movement as in the first described structure; that is, the mounting posts carry a pivot frame 5, pivot shaft 6, needle 7, counterweight 8, restoring spring 9, and fixed arm 10, all as previously described except that the lengths of the needle 7 and fixed arm 10 are proportionately less than the first described structure.

In order to charge the meter, the case 33 is formed of dielectric material capable of producing a surface or static charge. An internal groove 36 is provided in which rides a friction arm 37 suitably anchored to the base 31 by one of the mounting posts 4. The extremity of the friction arm 37 is provided with friction material 38 which rides in the groove 36.

Also mounted in the groove 36 is a collector ring 39, one end of which is folded radially inwardly to form a finger 40 capable of contacting the pivot frame 5 for electrical connection to the meter movement.

Operation of the radiation meter shown in Figures 6 and 7 is as follows:

When desiring to charge the meter, the case is rotated clockwise as viewed in Figure 6. This causes the finger 40 to bear against the pivot frame 5 so that the electrostatic charge may be conducted to the meter movement. When the case is rotated counterclockwise, the finger 40 is moved away from the pivot frame 5 until retained by a stop member 41 which may be a projection of the same member from which the friction arm 37 extends.

Having thus described certain embodiments and applications of my invention, I do not desire to be limited, but intend to claim all novelty inherent in the appended claims.

I claim:

1. A radiation meter, involving: a housing, a fixed electrode, a movable needle, yieldable means for urging said movable electrode toward said fixed electrode, all mounted on said housing; a charging device in said housing including a rotatable element accessible from the exterior of said housing, and a coacting friction element secured within said housing, said element adapted to generate a static charge; and means for collecting said static charge for transfer to said electrodes whereby said electrodes are repelled from each other.

2. A radiation meter, involving: a case; an electroscope therein including a fixed and a movable element; a shaft protruding laterally through said case; a winding disc at the outer end of said shaft; a charging wheel at the inner end of said shaft; friction brushes engageable with said charging wheel; a charge take-off member also engageable with said charging wheel; said shaft being axially movable to shift said charge take off member to and from electrical connection with said electroscope.

3. A radiation meter, involving: a case; a bearing block mounted in said case; a shaft rotatable and axially translatable therein; a turning wheel at one end and a friction wheel at the other end of said shaft; a retainer clip carried by said shaft including clip arms engageable with said bearing block to hold said shaft in a retracted or extended position; friction pads carried by said retainer clip for engagement with said friction wheel; a charge take-off member adapted to ride on said wheel and movable on axial shifting of said shaft between an operative and an inoperative position relative to said electroscope.

4. A radiation meter involving: a housing the interior surface being composed of at least semiconducting material; an electroscope mounted therein and including a pivot frame insulated from said case; a pivot shaft journalled in said pivot frame; a movable electrode carried by said pivot shaft and extending radially therefrom for arcuate movement; a fixed electrode extending from said frame and disposed to occupy a position in adjacent parallellism with said movable electrode when in one extreme position; and a spring urging said shaft in a direction to bring said electrodes into juxtaposition; and means for charging said electrodes relative to said housing to cause said electrodes to repel each other in opposition to said spring.

5. A radiation meter as set forth in claim 4 wherein said charging means is contained within said housing and includes a rotatable shaft protruding from said housing; a charging wheel rotated by said shaft; a charging means engageable with said wheel; a collector element adapted to ride on said charging wheel; and switch means operated through said collector element and charging wheel for electrically connecting said collector element with said electroscope.

6. A radiation meter as set forth in claim 4 wherein: said charging means involves a rotatable charging ring forming a part of said housing; a charging brush engageable with said charging ring; a collector element adapted to ride in said charging ring; and switch means operated through said charging ring and collector element for electrically connecting said collector element with said electroscope.

CHARLES C. LAURITSEN.

REFERENCES CITED

The following references are of record in the file of this patent:

UNITED STATES PATENTS

| Number | Name | Date |
|---|---|---|
| 1,446,748 | Johnsen et al. | Feb. 27, 1923 |
| 1,855,669 | Glasser et al. | Apr. 26, 1932 |
| 2,168,464 | Yeda | Aug. 8, 1939 |

FOREIGN PATENTS

| Number | Country | Date |
|---|---|---|
| 18,827 | Great Britain | Dec. 11, 1913 |

OTHER REFERENCES

MDDC-886, 4 pp., January 17, 1947.
MDDC-395, pp. 1-6, October 28, 1946.